United States Patent
Leow

(10) Patent No.: US 11,269,427 B1
(45) Date of Patent: Mar. 8, 2022

(54) OPTICAL NAVIGATION DEVICE AND OPTICAL NAVIGATION METHOD

(71) Applicant: PixArt Imaging Inc., Hsin-Chu (TW)

(72) Inventor: Chun Heap Leow, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/182,176

(22) Filed: Feb. 22, 2021

(51) Int. Cl.
*G06F 3/03* (2006.01)
*G06F 3/0354* (2013.01)

(52) U.S. Cl.
CPC ........ *G06F 3/03543* (2013.01); *G06F 3/0304* (2013.01)

(58) Field of Classification Search
CPC ............................ G06F 3/03543; G06F 3/0304
See application file for complete search history.

(56) References Cited

U.S. PATENT DOCUMENTS

| | | | |
|---|---|---|---|
| 2014/0092019 A1* | 4/2014 | Chen | G06F 3/0317 345/163 |
| 2017/0131799 A1* | 5/2017 | Tan | G06F 3/038 |
| 2018/0348373 A1* | 12/2018 | Chen | H04N 5/2256 |

* cited by examiner

*Primary Examiner* — Patrick N Edouard
*Assistant Examiner* — Joseph P Fox
(74) *Attorney, Agent, or Firm* — Winston Hsu

(57) ABSTRACT

An optical navigation device comprising: a first optical sensing region, having a first power consumption rate; and a second optical sensing region, having a second power consumption rate higher than the first power consumption rate. The optical navigation device applies the first optical sensing region to sense first optical data when the optical navigation device moves for a first speed, and the optical navigation device applies the second optical sensing region to sense second optical data when the optical navigation device moves for a second speed higher than the first speed.

16 Claims, 5 Drawing Sheets

OPTICAL NAVIGATION DEVICE AND OPTICAL NAVIGATION METHOD

BACKGROUND OF THE INVENTION

1. Field of the Invention

The present invention relates to an optical navigation device, and particularly relates to an optical navigation device which can reduce the power consumption of the optical sensor when the optical navigation device has a low speed.

2. Description of the Prior Art

An optical sensor of a conventional optical navigation device always uses a variable frame rate (VFR) technique to achieve power efficiency. That is, the frame rate varies corresponding to the optical sensor moving speed, which also means the optical navigation device moving speed. However, the frame rate of the optical sensor could not be lower than a minimum frame rate, which equals to a USB reporting rate to maintain the consistency of motion delta reporting. Therefore, reduction of the power consumption of the optical sensor is limited by the minimum frame rate.

SUMMARY OF THE INVENTION

Therefore, one objective of the present invention is to provide an optical navigation device which can reduce power consumption while moving for a slow speed.

One embodiment of the present invention discloses an optical navigation device comprising: a first optical sensing region, having a first power consumption rate; and a second optical sensing region, having a second power consumption rate higher than the first power consumption rate. The optical navigation device applies the first optical sensing region to sense first optical data when the optical navigation device moves for a first speed, and the optical navigation device applies the second optical sensing region to sense second optical data when the optical navigation device moves for a second speed higher than the first speed.

Another embodiment of the present invention discloses an optical navigation device comprising: a first optical sensing region; and a second optical sensing region, wherein a size of the first optical sensing region is smaller than a size of the second optical sensing region, wherein the first optical sensing region and the second optical sensing region have identical pixel densities. The optical navigation device applies the first optical sensing region to sense first optical data when the optical navigation device moves for a first speed, and the optical navigation device applies the second optical sensing region to sense second optical data when the optical navigation device moves fora second speed higher than the first speed.

Still another embodiment of the present invention discloses an optical navigation device comprising: a sensor array, having a first optical sensing region and a second optical sensing region, wherein a size of the first optical sensing region is smaller than a size of the second optical sensing region. The optical navigation device only applies the first optical sensing region to sense first optical data when the optical navigation device moves for a first speed, and the optical navigation device only applies the second optical sensing region to sense second optical data when the optical navigation device moves fora second speed higher than the first speed.

In view of above-mentioned embodiments, the optical navigation device can use an optical sensing region while having a low speed, to save the power consumption when the optical navigation device moves for a low speed.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Besides, the term "first", "second", "third" in following descriptions are only for the purpose of distinguishing different one elements, and do not mean the sequence of the elements. For example, a first device and a second device only mean these devices can have the same structure but are different devices.

Figure 1:
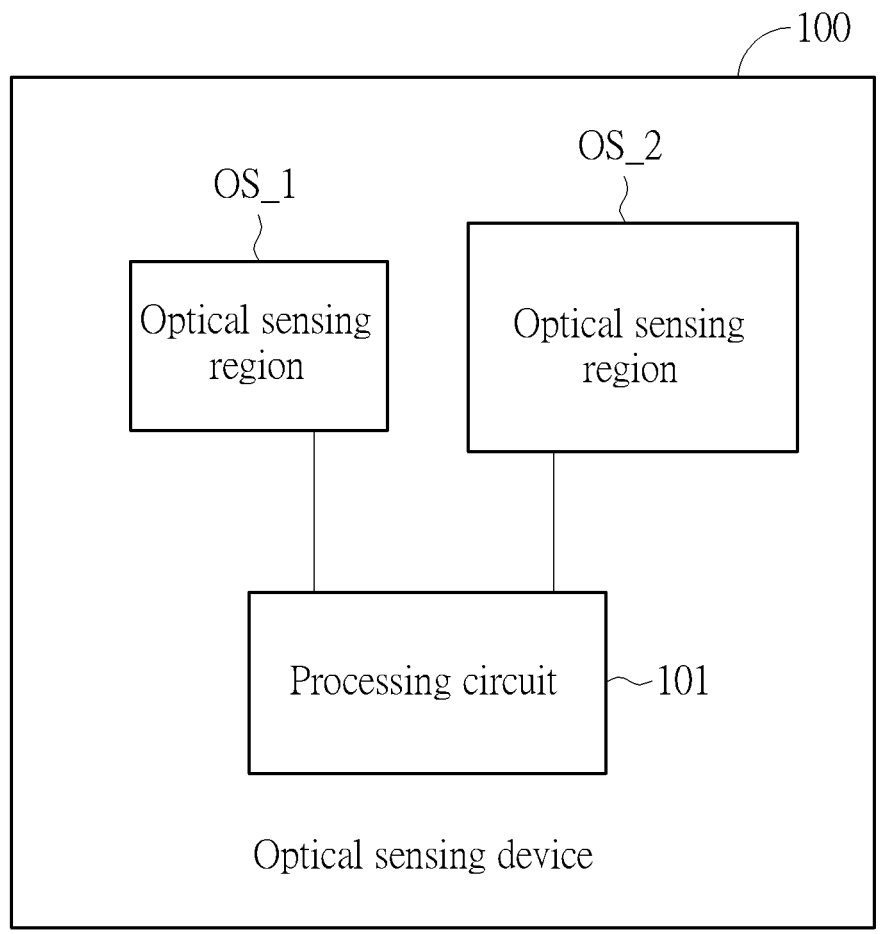
FIG. 1 is a block diagram illustrating an optical navigation device according to one embodiment of the present invention.

FIG. 1 is a block diagram illustrating an optical navigation device 100 according to one embodiment of the present invention. As illustrated in FIG. 1, the optical navigation device 100 comprises a first optical sensing region OS_1, a second optical sensing region OS_2 and a processing circuit 101. The first optical sensing region OS_1 has a first power consumption rate, and the second optical sensing region OS_2 has a second power consumption rate higher than the first power consumption rate. For example, the first optical sensing region OS_1 has a first power consumption of A mW/sec, and the second optical sensing region OS_2 has a second power consumption of B mW/sec higher than A mW/sec.

The processing circuit 101 controls the optical navigation device 100 to apply the first optical sensing region OS_1 to sense first optical data when the optical navigation device 100 moves for a first speed (i.e., the first optical sensing region OS_1 and the second optical sensing region OS_2 moves for the first speed). Also, the processing circuit 101 controls the optical navigation device 100 to apply the second optical sensing region OS_2 to sense second optical data when the optical navigation device 100 moves fora second speed (i.e., the first optical sensing region OS_1 and the second optical sensing region OS_2 moves for the second speed) higher than the first speed.

It will be appreciated that the optical sensing regions are image sensing regions in the embodiment of FIG. 1 and in following embodiments, and the optical data comprises at least one image in the embodiment of FIG. 1 and in following embodiments. However, the optical data can mean data comprises optical features such as brightness and the optical sensing regions can mean corresponding sensors.

Please refer to FIG. 1 again, in one embodiment, a size of the first optical sensing region OS_1 is smaller than a size of the second optical sensing region OS_2. In such case, the first optical sensing region OS_1 and the second optical sensing region OS_2 have identical pixel densities, thus a number of pixels of the first optical sensing region OS_1 is smaller than a number of pixels of the second optical sensing region OS_2. For example, the first optical sensing region OS_1 is a sensor array comprises 22*22 pixels, 24*24 pixels or 26*26 pixels, and the second optical sensing region OS_2 is a sensor array comprises 30*30 pixels.

However, the first optical sensing region OS_1 and the second optical sensing region OS_2 may have different power consumption rates due to different reasons. For example, the first optical sensing region OS_1 and the second optical sensing region OS_2 are different optical sensors with different power consumption rates. For another example, first optical sensing region OS_1 and the second optical sensing region OS_2 may have the same sizes but have different pixel densities.

In one embodiment, the first optical sensing region OS_1 and the second optical sensing region OS_2 are different optical sensors, as illustrated in FIG. 1. Also, in another embodiment, the first optical sensing region OS_1 and the second optical sensing region OS_2 are different regions of a single optical sensor.

Figure 2:
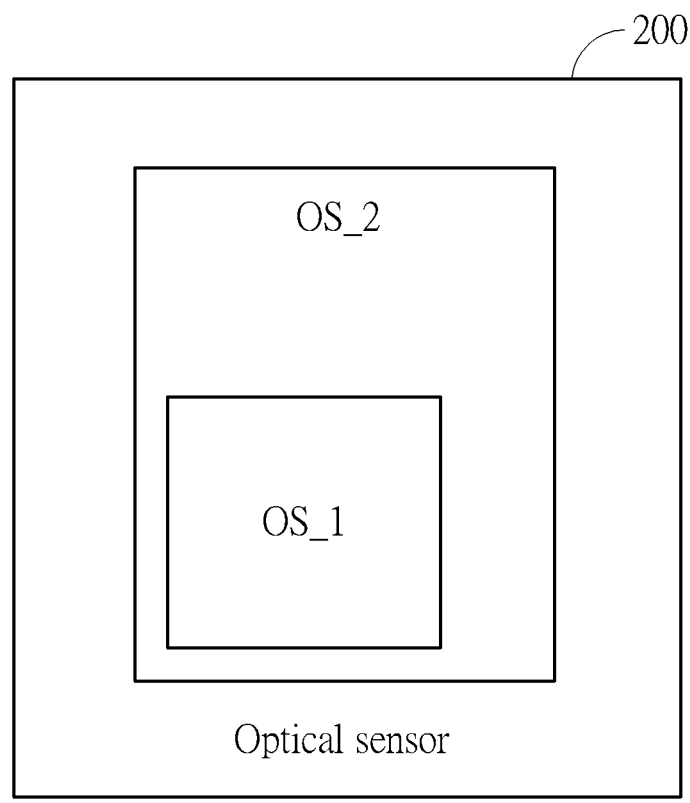
FIG. 2 and FIG. 3 are block diagrams illustrating optical navigation devices according to different embodiments of the present invention.
Figure 3:
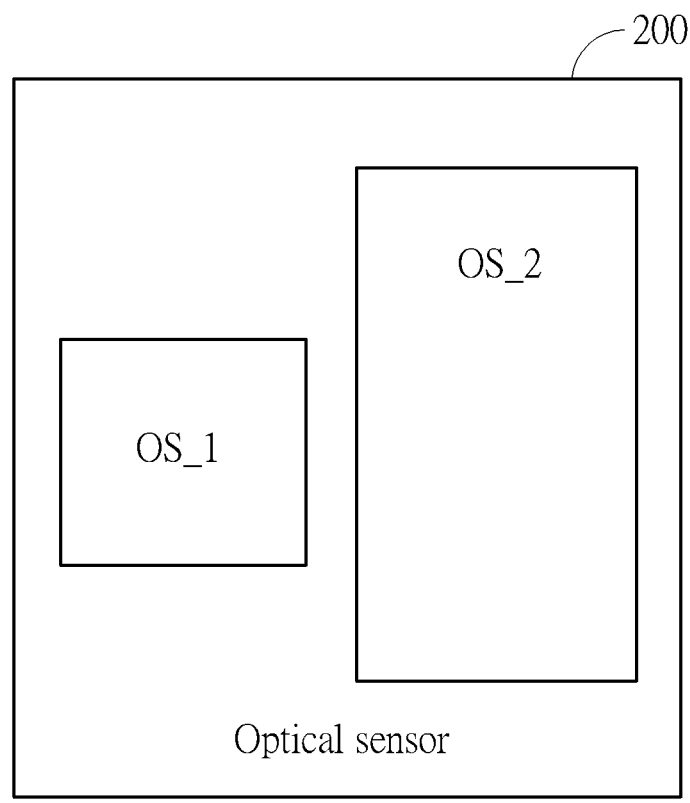

FIG. 2 and FIG. 3 are block diagrams illustrating optical navigation devices according to different embodiments of the present invention, which respectively illustrate the embodiments that the first optical sensing region OS_1 and the second optical sensing region OS_2 are respectively portions of a single optical sensor. As illustrated in FIG. 2 and FIG. 3, the first optical sensing region OS_1 and the second optical sensing region OS_2 are portions of the optical sensor 200. In the embodiment of FIG. 2, the pixels of the first optical sensing region OS_1 and the second optical sensing region OS_2 are overlapped. Further, in the embodiment of FIG. 3, the pixels of the first optical sensing region OS_1 and the second optical sensing region OS_2 are totally different. Please note, the arrangements and the sizes of the first optical sensing region OS_1 and the second optical sensing region OS_2 are not limited to the examples illustrated in FIG. 2 and FIG. 3.

Also, please note that the optical navigation device provided by the present invention is not limited to have two optical sensing regions. In one embodiment, the optical navigation device 100 further comprises a third optical sensing regions which has a third power consumption rate smaller than the first power consumption rate. In such case, the processing circuit 101 controls the optical navigation device 100 to apply the third optical sensing region to sense third optical data when the optical navigation device 100 moves for a third speed lower than the first speed.

The following table Ta1 is an example of operations of the embodiments illustrated in FIG. 1, FIG. 2 and FIG. 3. However, the operations of the optical navigation device provided by the present invention are not limited to the following Table.

Ta1

| Speed | Frame rate | Sensor Size | Power consumption rate |
|-------|-----------|-------------|------------------------|
| SP_1  | F_1       | SZ_1        | P_1                    |
| SP_2  | F_1       | SZ_2        | P_2                    |
| SP_3  | F_1       | SZ_3        | P_3                    |
| SP_4  | F_2       | SZ_4        | P_4                    |

In Table 1, SP_1<SP_2<SP_3<SP_4, SZ_1<SZ_2<SZ_3<SZ_4, and P_1<P_2<P_3<S_4. Therefore, in one example of the embodiment in FIG. 1, a frame rate of the first optical sensing region OS_1 while the optical navigation device 100 moves for the first speed and a frame rate of the second optical sensing region OS_2 while the optical navigation device 100 moves for the second speed higher than the first speed are identical. For example, the optical sensor with the size SZ_2 is used when the optical navigation device 100 moves for the speed SP_2 and the optical sensor with the size SZ_3 is used when the optical navigation device 100 moves for the speed SP_3. Also, the optical sensor with the SZ_2 and optical sensor with the SZ_3 have the same frame rates.

Besides, in another example of the embodiment in FIG. 1, a frame rate of the first optical sensing region OS_1 while the optical navigation device 100 moves for the first speed and a frame rate of the second optical sensing region OS_2 while the optical navigation device 100 moves for the second speed higher than the first speed are different. For example, the optical sensor with the size SZ_3 is used when the optical navigation device 100 moves for the speed SP_3 and the optical sensor with the size SZ_4 is used when the optical navigation device 100 moves for the speed SP_4. Also, the optical sensor with the size SZ_3 and optical sensor with the size SZ_4 have different frame rates.

In one embodiment, the optical navigation device provided by the present invention further provides a compensation procedure to compensate the motion delta computed according to optical data sensed by different optical sensing regions.

Figure 4:
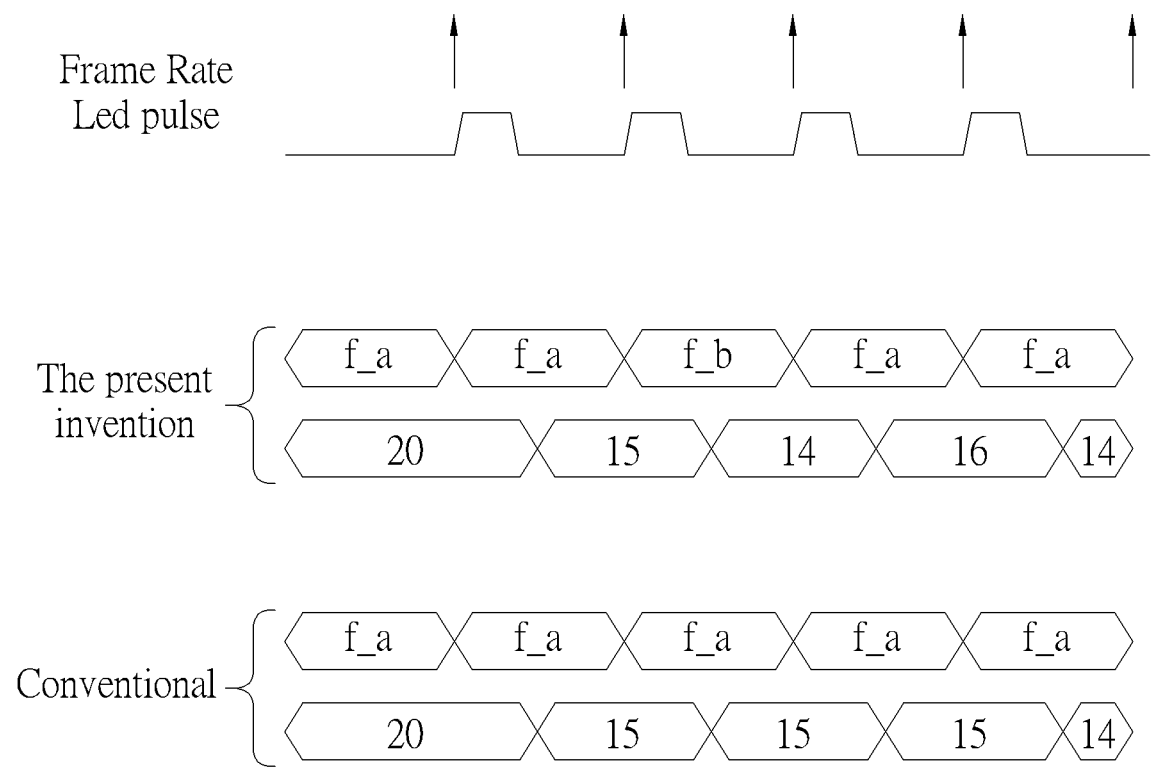
FIG. 4 is a schematic diagram illustrating the operations of the optical navigation device provided by the present invention, according to one embodiment of the present invention.

FIG. 4 is a schematic diagram illustrating the operations of the optical navigation device provided by the present invention, according to one embodiment of the present invention. In the embodiment of FIG. 4, the frame f_a means the frame sensed by the second optical sensing region OS_2 and the frame f_b means the frame sensed by the first optical sensing region OS_1. For a conventional optical navigation device, a fixed second optical sensing region OS_2 which has a larger size is used, thus the frames sensed thereby are all frames f_a. The processing circuit of the conventional optical navigation device computes motion deltas according different ones of frames f_a, to acquire the motion deltas such as 20, 15.

However, in the optical navigation device provided by the present invention, the first optical sensing region OS_1 which has a smaller size is used when the optical navigation device has a lower speed, thus the frame f_b is acquired. In such case, the processing circuit of the optical navigation device provided by the present invention acquires the motion delta 14 according to the frame f_b. Also, the processing circuit of the optical navigation device provided by the present invention acquires motion delta according to the frame f_a following the frame f_b. The motion delta according to the frame f_a following the frame f_b is supposed to 15 if no compensation procedure is performed. However, since the first optical sensing region OS_1 is smaller thus the frame f_b is smaller, such that some motion delta may be lost due to the smaller frame. Therefore, in the embodiment of FIG. 4, the motion delta according to the frame f_a following the frame f_b is increased from 15 to 16, compensate the possible motion delta lost caused by the frame f_b.

Therefore, the embodiment illustrated in FIG. 4 can be summarized as: the optical navigation device 100 applies the first optical sensing region OS_1 to sense first optical data (e.g., frame fb) before applies the second optical sensing region OS_2 to sense second optical data (e.g., frame fa following the frame f_b). The processing circuit 101 computes first motion delta (e.g., 14) based on the first optical data and computes second motion delta (e.g., 15) based on the second optical data. The processing circuit 101 further modifies the second motion delta to a modified motion delta (e.g., 16) according to a relation between the first optical sensing region OS_1 and the second optical sensing region OS_2.

In one embodiment, the processing circuit 101 modifies the second motion delta to generate the modified motion delta according to a ratio between the size of the first optical sensing region OS_1 and the size of the second optical sensing region OS_2. In another embodiment, the processing circuit 101 modifies the second motion delta to generate the modified motion delta according to a ratio between the first power consumption rate of the first optical sensing region OS_1 and the second power consumption rate of the second optical sensing region OS_2. However, the processing circuit 101 can modify the second motion delta to generate the modified motion delta according to any other algorithm.

Figure 5:
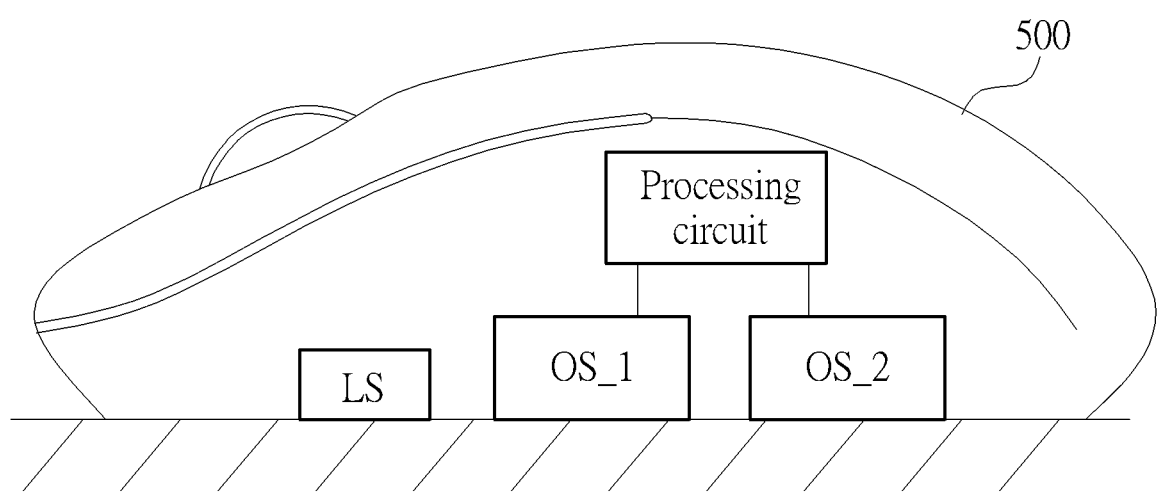
FIG. 5 is a schematic diagram illustrating an example that the optical navigation device is an optical mouse.

The optical navigation device provided by the present invention can be an optical mouse, but not limited. FIG. 5 is a schematic diagram illustrating an example that the optical navigation device is an optical mouse. As illustrated in FIG. 5, the optical mouse 500 comprises the first optical sensing region OS_1, the optical sensing region OS_2 and the processing circuit 101 illustrated in FIG. 1. Besides, the optical mouse 500 further comprises a light source LS configured to emit light to a surface on which the optical mouse 500 is provided (e.g., a table surface). The first optical sensing region OS_1 senses first optical data generated according to the light from the light source LS, and the second optical sensing region OS_2 senses second optical data generated according to the light from the light source LS. The processing circuit 101 can compute motion deltas according to first optical data or second optical data, and accordingly determines the movement of the optical mouse 500.

Besides, when the optical mouse 500 is moving, the processing circuit 101 can compute a speed of the optical mouse 500 according to optical data sensed by the used optical sensing region. After that, the used optical sensing region can be changed corresponding to the speed. For example, the processing circuit 101 initially uses the second optical sensing region OS_2 and the processing circuit 101 computes a speed of the optical mouse 500 according to second optical data sensed by the second optical sensing region OS_2. If the speed of the optical mouse 500 is lower than a predetermined threshold, the optical mouse 500 is switched to use the first optical sensing region OS_1.

In view of above-mentioned embodiments, the optical navigation device can use an optical sensing region while having a low speed, to save the power consumption when the optical navigation device moves for a low speed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device, comprising:
  a first optical sensing region, having a first power consumption rate;
  a second optical sensing region, having a second power consumption rate higher than the first power consumption rate; and
  a processing circuit;
  wherein the optical navigation device applies the first optical sensing region to sense first optical data when the optical navigation device moves for a first speed, and the optical navigation device applies the second optical sensing region to sense second optical data when the optical navigation device moves for a second speed higher than the first speed;
  wherein the optical navigation device applies the first optical sensing region to sense first optical data before the optical navigation device applies the second optical sensing region to sense second optical data, wherein the processing circuit computes first motion delta based on the first optical data and computes second motion delta based on the second optical data, wherein the processing circuit further modifies the second motion delta to a modified motion delta according to a relation between the first optical sensing region and the second optical sensing region.

2. The optical navigation device of claim 1, wherein the first optical sensing region and the second optical sensing region are different optical sensors.

3. The optical navigation device of claim 1, wherein the first optical sensing region and the second optical sensing region are respectively portions of a single optical sensor.

4. The optical navigation device of claim 1, wherein a size of the first optical sensing region is smaller than a size of the second optical sensing region, wherein the first optical sensing region and the second optical sensing region have identical pixel densities.

5. The optical navigation device of claim 1, wherein a frame rate of the first optical sensing region while the optical navigation device has the first speed and a frame rate of the second optical sensing region while the optical navigation device has the second speed are identical.

6. The optical navigation device of claim 1, wherein a frame rate of the first optical sensing region while the optical navigation device has the first speed and a frame rate of the second optical sensing region while the optical navigation device has the second speed are different.

7. The optical navigation device of claim 1,
  wherein a size of the first optical sensing region is smaller than a size of the second optical sensing region;
  wherein the processing circuit modifies the second motion delta to generate the modified motion delta according to a ratio between the size of the first optical sensing region and the size of the second optical sensing region.

8. The optical navigation device of claim 1, wherein the processing circuit modifies the second motion delta to generate the modified motion delta according to a ratio between the first power consumption rate and the second power consumption rate.

9. The optical navigation device of claim 1, wherein the optical navigation device is an optical mouse.

10. An optical navigation device, comprising:
  a first optical sensing region;

a second optical sensing region, wherein a size of the first optical sensing region is smaller than a size of the second optical sensing region, wherein the first optical sensing region and the second optical sensing region have identical pixel densities; and a processing circuit;

wherein the optical navigation device applies the first optical sensing region to sense first optical data when the optical navigation device moves for a first speed, and the optical navigation device applies the second optical sensing region to sense second optical data when the optical navigation device moves for a second speed higher than the first speed;

wherein the optical navigation device applies the first optical sensing region to sense first optical data before the optical navigation device applies the second optical sensing region to sense second optical data, wherein the processing circuit computes first motion delta based on the first optical data and computes second motion delta based on the second optical data, wherein the processing circuit further modifies the second motion delta to a modified motion delta according to a relation between the first optical sensing region and the second optical sensing region.

11. The optical navigation device of claim 10, wherein the first optical sensing region and the second optical sensing region are different optical sensors.

12. The optical navigation device of claim 10, wherein the first optical sensing region and the second optical sensing region are respectively portions of a single optical sensor.

13. The optical navigation device of claim 10, wherein a frame rate of the first optical sensing region while the optical navigation device has the first speed and a frame rate of the second optical sensing region while the optical navigation device has the second speed are identical.

14. The optical navigation device of claim 10, wherein a frame rate of the first optical sensing region while the optical navigation device has the first speed and a frame rate of the second optical sensing region while the optical navigation device has the second speed are different.

15. The optical navigation device of claim 10, wherein the processing circuit modifies the second motion delta to generate the modified motion delta according to a ratio between the size of the first optical sensing region and the size of the second optical sensing region.

16. The optical navigation device of claim 10, wherein the optical navigation device is an optical mouse.

* * * * *